US012719866B2

(12) United States Patent
Narula et al.

(10) Patent No.: US 12,719,866 B2
(45) Date of Patent: Aug. 25, 2026

(54) MULTI-LINK CONNECTIVITY MANAGEMENT FOR AN INFORMATION HANDLING SYSTEM

(71) Applicant: Dell Products L.P., Round Rock, TX (US)

(72) Inventors: Harpreet Narula, Austin, TX (US); Anit Lohtia, Plano, TX (US)

(73) Assignee: Dell Products L.P., Round Rock, TX (US)

( * ) Notice: Subject to any disclaimer, the term of this patent is extended or adjusted under 35 U.S.C. 154(b) by 314 days.

(21) Appl. No.: 18/173,529

(22) Filed: Feb. 23, 2023

(65) Prior Publication Data

US 2024/0291819 A1 Aug. 29, 2024

(51) Int. Cl.

| | |
|---|---|
| ***H04L 9/40*** | (2022.01) |
| ***H04L 67/52*** | (2022.01) |
| ***H04L 67/562*** | (2022.01) |
| ***H04W 12/06*** | (2021.01) |
| ***H04W 12/63*** | (2021.01) |

(52) U.S. Cl.

CPC .......... *H04L 63/0884* (2013.01); *H04L 67/52* (2022.05); *H04L 67/562* (2022.05); *H04W 12/06* (2013.01); *H04W 12/63* (2021.01)

(58) Field of Classification Search

CPC ... H04L 63/0884; H04L 67/52; H04L 67/562; H04W 12/06

See application file for complete search history.

(56) References Cited

U.S. PATENT DOCUMENTS

| | | | | |
|---|---|---|---|---|
| 7,768,967 B1 * | 8/2010 | Mangal | H04M 1/72511 | 375/220 |
| 8,370,917 B1 * | 2/2013 | Hayes | H04L 63/0823 | 713/153 |
| 8,953,623 B1 * | 2/2015 | Eyada | H04L 47/125 | 370/401 |
| 2002/0131436 A1 * | 9/2002 | Suri | H04M 11/062 | 370/463 |
| 2006/0215636 A1 * | 9/2006 | Corley | H04M 7/0087 | 370/352 |
| 2008/0153443 A1 * | 6/2008 | Takusagawa | H04W 36/142 | 455/187.1 |
| 2015/0079925 A1 * | 3/2015 | Hu | H04M 15/68 | 455/406 |
| 2016/0112495 A1 * | 4/2016 | Gizis | H04L 67/52 | 709/219 |
| 2018/0302951 A1 * | 10/2018 | Christopherson | H04W 88/10 | |

* cited by examiner

*Primary Examiner* — Kostas J Katsikis

(74) *Attorney, Agent, or Firm* — Norton Rose Fulbright US LLP

(57) ABSTRACT

Systems and methods described herein may allow an information handling system to utilize a plurality of cellular radio connections simultaneously. A proxy server may enable concurrent connections using cellular networks of multiple operators, including public and private cellular networks. An information handling system may leverage this multi-link connectivity to allocate the optimal connection based on a plurality of factors such as an application's quality of service requirements and radio frequency environment. Other aspects are also disclosed.

14 Claims, 6 Drawing Sheets

MULTI-LINK CONNECTIVITY MANAGEMENT FOR AN INFORMATION HANDLING SYSTEM

FIELD OF THE DISCLOSURE

The instant disclosure relates to information handling systems. More specifically, portions of this disclosure relate to concurrent cellular radio connections for an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A cellular service provider has the end-to-end control of a user's cellular connectivity, and there can only be one cellular connection active at a given time in a single module. This may limit the user's ability to leverage the optimal cellular connection that would otherwise be available to their device. This limitation may also prevent the user from accessing higher reliability for wireless mobile connections for a device.

SUMMARY

Within a single device, different applications may have differing quality of service needs, so it would be beneficial for a device to manage independent connectivity for each application to be matched with a network that meets its unique QoS needs. A SIM proxy server may enable concurrent cellular radio connections using cellular networks of multiple operators, including public and private cellular networks. An information handling system may leverage this multi-link connectivity to allocate the optimal connection based on factors such as application requirements and radio frequency environment.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

A proxy server may intercede in configuring user devices for connection to a service provider by selecting a service provider from many available service providers at the user device's location based on one or more criteria (e.g., wireless conditions, application quality of service (QoS) requirements, and/or costs). The proxy server authenticates with one or more service providers selected by the proxy server and provides credentials to the user device. The user device then authenticates with the service provider using the credentials to obtain service. The authentication between the proxy server and a service provider obtains credentials (e.g., a SIM or eSIM) for an end user. The user device configured with the credentials (SIM/eSIM) are stored in the user device during the initial configuration of the device. The user device uses these credentials to obtain service. The user device may obtain improved service through the proxy server because the proxy server can choose from many available service providers, whereas a conventional user device is limited to one or two active SIMs that are manually configured by a user of the user device. The selection of a service provider at the proxy server may be improved by crowdsourcing data from many users, with the data from user devices at different locations and in different conditions stored as part of the crowdsourced data. The selection of a service provider at the proxy server may benefit the user by providing lower cost service on a user device that is matched to the user device's requirements.

According to one embodiment, a method for execution by a proxy server may include receiving, by the proxy server, a request for subscriber identity information from an information handling system; performing, by the proxy server, registration of the information handling system to a network accessible from a location of the information handling system; determining, by the proxy server, a connection from a plurality of available connections for a communication session; and communicating, by the proxy server, with an authentication service corresponding to the connection to authenticate the information handling system for establishing the communication session on the connection. In some embodiments, determining the connection is based on at least one of: location of the information handling system; cost of connectivity with each available provider; or application requirements for quality of service. In certain embodiments, each of the plurality of available connections is associated with a profile on the information handling system. In some embodiments, the information handling system simultaneously connects with more than one of the plurality of available connections. In certain embodiments, the proxy server comprises credentials from the information handling system. In some embodiments, the proxy server is either local on the information handling system or global.

In some embodiments, the method may further include communicating, by the proxy server, with an authentication service corresponding to a default connection to authenticate the information handling system for establishing a communication session on the connection when a request for subscriber identity information from the information handling system has not been received.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

In some embodiments of the disclosure, a SIM proxy server may abstract cellular authentication with multiple carriers from a device. The proxy server may determine at least one available network provider in the location of the information handling system. Based on the information handling system's location and subscription credentials, the proxy server may perform the registration of the information handling system in the service area. The proxy server may receive a request for subscriber identity information from the information handling system, such as a request to initiate a connection with a network provider. Various factors may influence the proxy server's selection of a network provider to provide connectivity, such as, for example, the location of the information handling system, the cost of connectivity with each available provider, and/or the application requirements for quality of service. The proxy server may determine a connection from a plurality of available network providers for a communication session. The proxy server may store credentials from the information handling system and communicate with an authentication service corresponding to the network provider to authenticate the information handling system for establishing the communication session on the connection.

These example embodiments describe and illustrate various configurations of performing multi-link connectivity management for an information handling system to allow simultaneous communication sessions.

Figure 1:
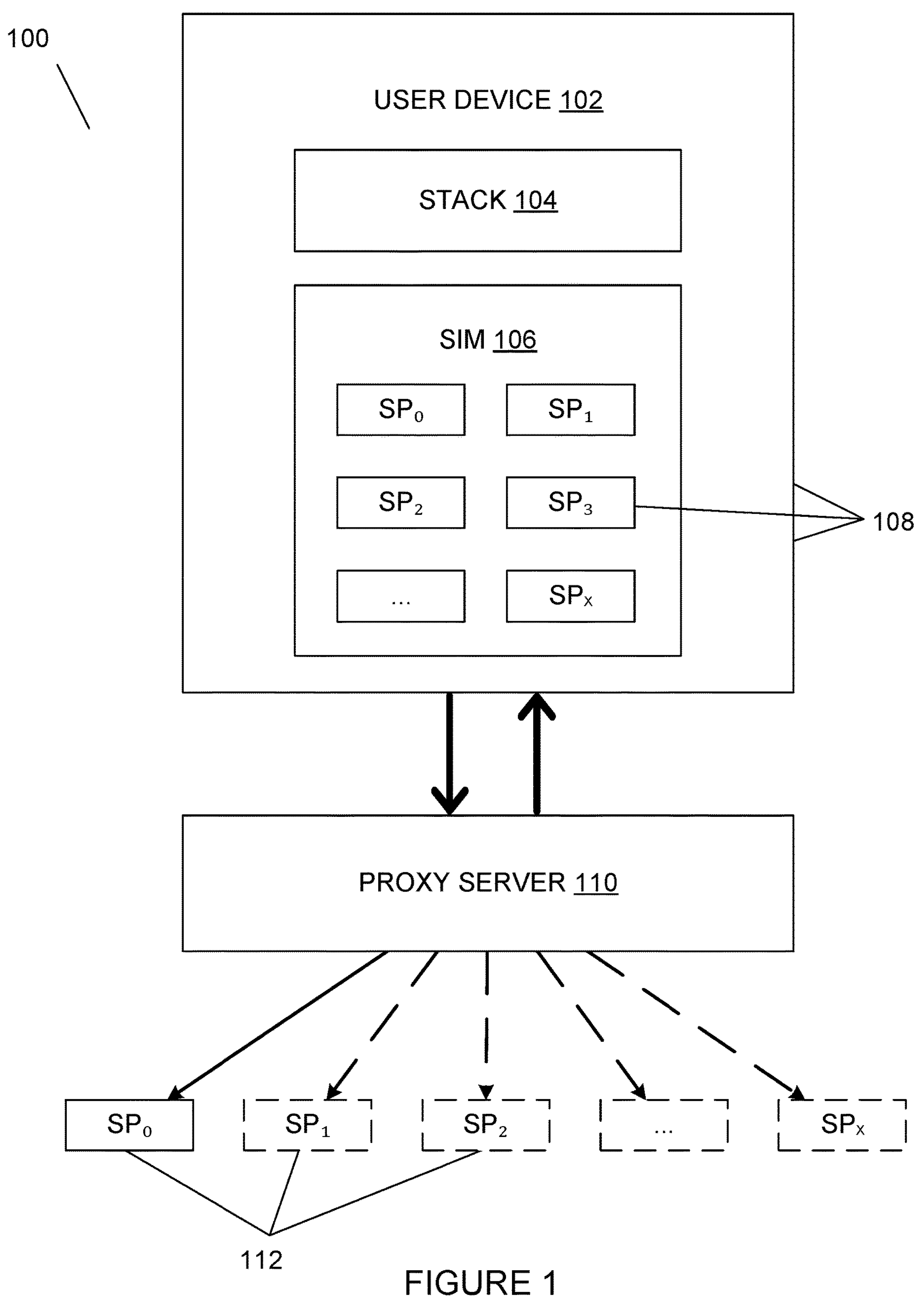
FIG. 1 is a block diagram illustrating single-link connectivity management of an information handling system with a decentralized proxy server according to certain embodiments of the disclosure.

FIG. 1 illustrates single-link connectivity management of an information handling system with a decentralized proxy server according to certain embodiments of the disclosure. Block diagram 100 depicts an information handling system, user device 102, comprising protocol stack 104 and subscriber identity module (SIM) 106. The user device 102 accesses a proxy server 110 to initiate a connection with at least one service provider 112. The user device 102 may have a default connection with a service provider 112, also facilitated by the proxy server 110, for continued connectivity when the proxy server 110 is not accessible. The proxy server 110 may store the information for the user of user device 102, information for the available service providers 112 within a geological area, and costs associated with each service provider 112. The proxy server 110 may execute an algorithm to determine a service provider profile 108 based on a rule comparing one or more criteria. The algorithm may use crowdsourced information acquired from multiple user devices the proxy server is authenticating. In other embodiments, information related to the user and service providers may be local to the user device 102 and transmitted to the proxy server 110, such as part of the connection request. The user device's 102 credentials may be stored in the user device 102 during its initial configuration. SIM 106 may be a physical SIM card located within the user device 102 or a software-based virtual-SIM or eSIM. The SIM 106 may be a proxy SIM, which abstracts the underlying multiple SIM using an application or operating system component of the user device 102. A profile may be maintained on the user device 102 associated with the proxy SIM, such as maintained in a look-up table corresponding to multiple SIMs. Provisioning of an eSIM using the proxy SIM may be enabled using, for example, factory provisioning or QR code. Provisioning of the eSIM using the proxy SIM may be provided using MNO/MVNO discovery services with a Bootstrap profile.

Service provider profiles 108 located on the user device 102 are tokens, each associated with a profile of an available service provider 112. Upon receiving a request for subscriber identify information from the user device 102, the proxy server 110 may select one of a plurality of service providers 112 for a communication session according to one or more criteria, such as a request's indicated requirements, a user's access level, and/or quality of service needs. The proxy server 110 communicates with the service provider 112 to authenticate the credentials of the user device 102 to access the service provider's 112 network. The user device may then communicate on the connection using an authentication token negotiated by the proxy server 110 and provided by the proxy server 110 to the user device 102.

Cloud management, through the proxy server 110, of user device connections provide better control over connectivity and crowd-sourced data (e.g., by improving selection of a connection based on which carrier is better in which area, cost for different carriers, whether WiFi is available or not, what application characteristics are required by a user whether voice video data etc., identify which connections have lower jitter/latency for handling video or voice connections).

Figure 2:
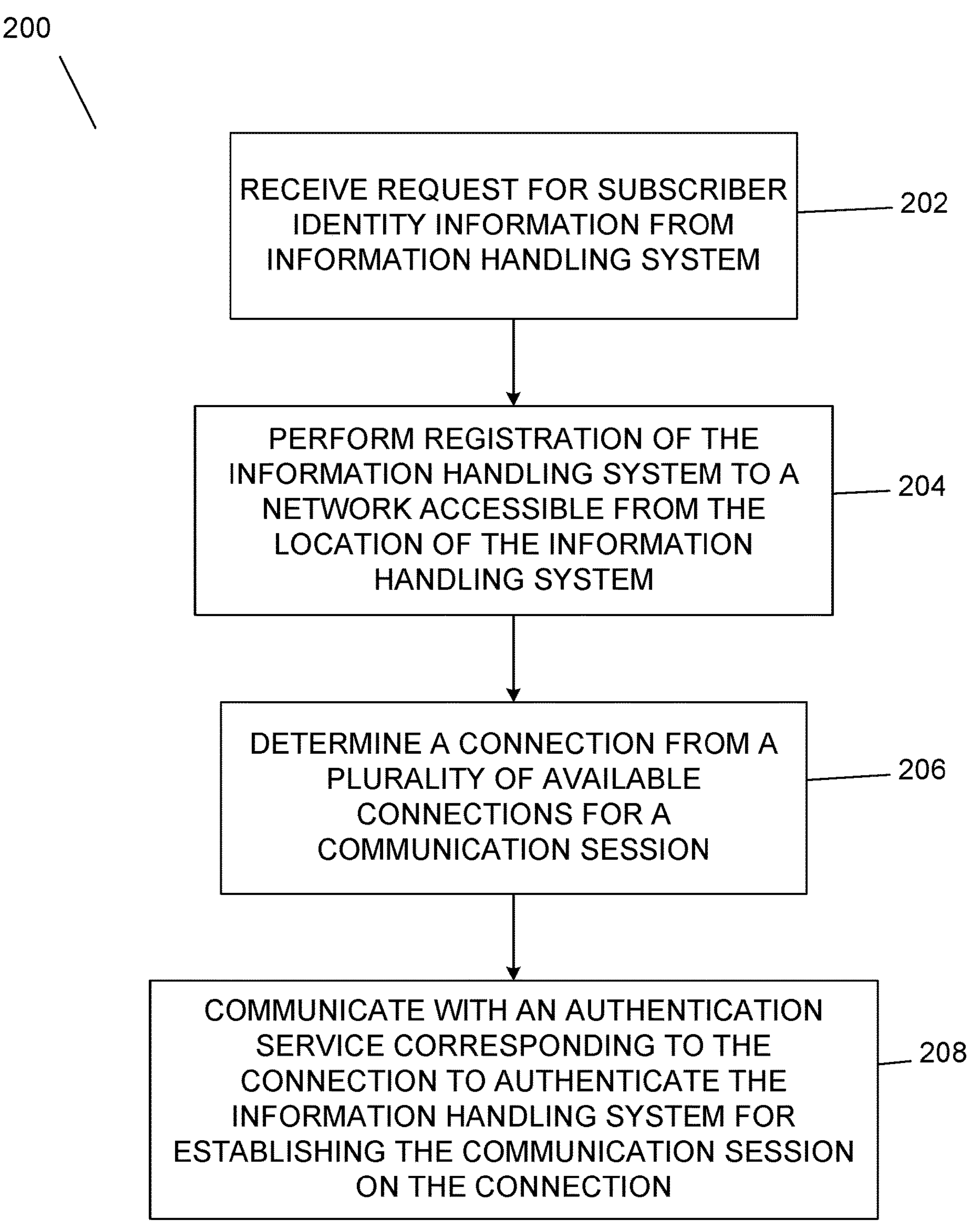
FIG. 2 is a flowchart illustrating a method of multi-link connectivity management according to certain embodiments of the disclosure.

FIG. 2 is a flowchart illustrating a method of multi-link connectivity management according to some embodiments of the disclosure. Flowchart 200 is executed by the proxy server. At block 202, the proxy server receives a request for subscriber identity information from an information handling system, such as a request to initiate a connection with a service provider. The proxy server performs registration of the information handling system to a network accessible from the location of the information handling system at block 204. The proxy server then determines a connection from a plurality of available connections for a communication session at block 206. To establish the connection at block 208, the proxy server communicates with an authentication service corresponding to the connection to authenticate the information handling system. A session credential (e.g., a SIM or eSIM) may be retrieved from the authentication service and provided to the information handling system. The information handling system subsequently authenticates the service provider and accesses the determined connection using the session credential. Changes to the connection, such as changing connections or changing subscription service levels, may be applied by the proxy server without reconfiguring the user device.

Figure 3:
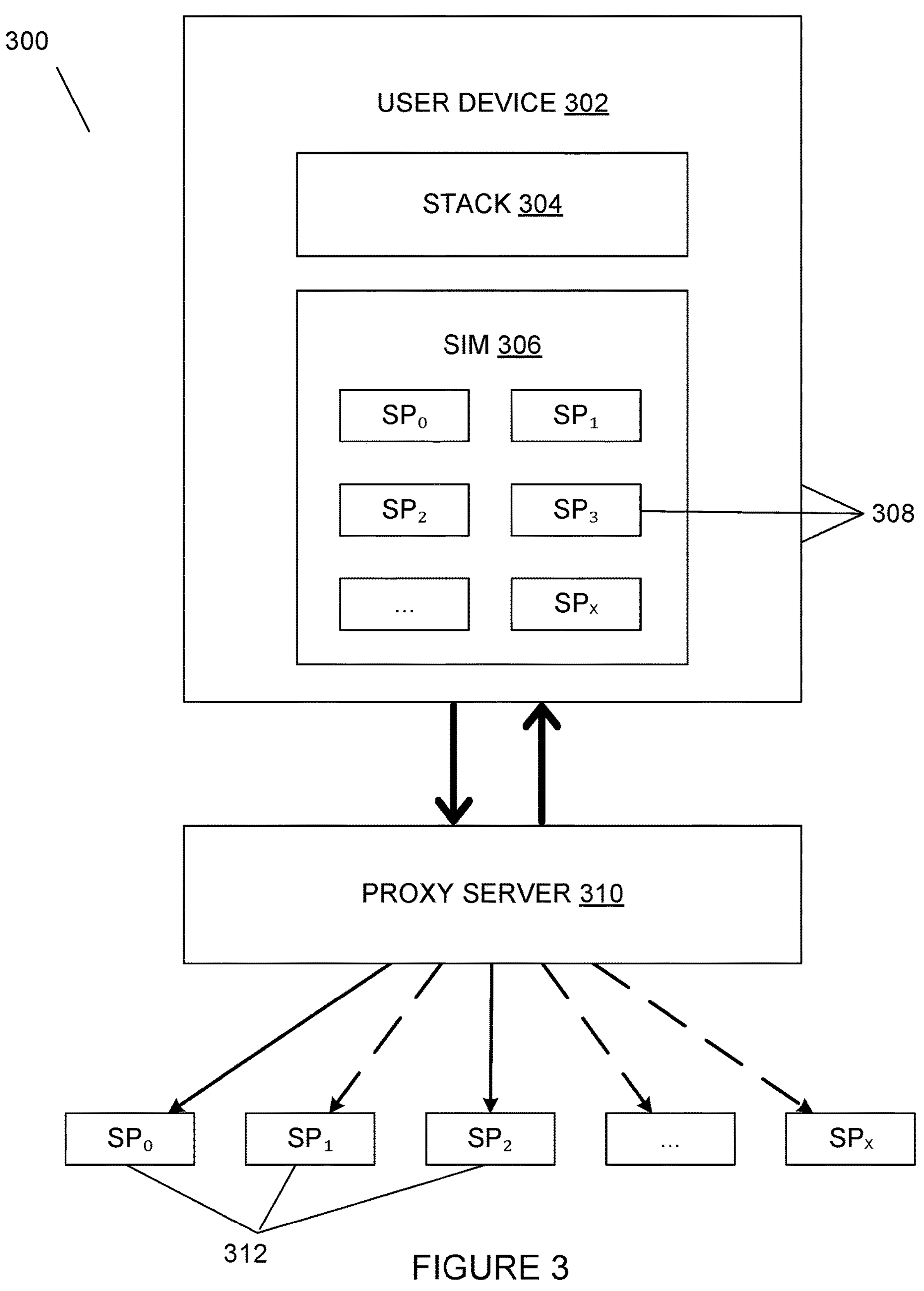
FIG. 3 is a block diagram illustrating multi-link connectivity with a decentralized proxy server according to certain embodiments of the disclosure.

FIG. 3 is a block diagram illustrating multi-link connectivity with a decentralized proxy server according to certain embodiments of the disclosure. Block diagram 300 depicts an information handling system, user device 302 comprising protocol stack 304 and SIM 306. The user device 302 uses a proxy server 310 to initiate a connection with more than one service provider 312. The proxy server 310 may store the information for the user of user device 302, information for the available service providers 312 within a geological area, and costs associated with each service provider 312. The proxy server 310 may execute an algorithm to determine which service provider profile 308 should be selected according to certain embodiments. In other embodiments, such information related to the user and service providers may be local to the user device 302. SIM 306 may be a physical SIM card located within the user device 302 or a software-based virtual-SIM or eSIM. Service provider profiles 308 located on the user device 302 are tokens, each associated with a profile of an available service provider 312. The user device 302 may send more than one request for subscriber identity information to the proxy server 310. Each request may pertain to a certain application or service. Examples would include originating a call, streaming a video, or accessing an online service or application which requires wireless connectivity according to some embodiments of the disclosure. Each request may be associated with different quality of service needs, for which different service providers may be the optimal connection. The proxy server 310 may select one of a plurality of service providers 312 for a communication session for each independent request. The proxy server 310 instructs the user device 302 to select the corresponding service provider profile 308 located on the user device 302. As a result, the user device 302 may be simultaneously connected with more than one of the plurality of available service providers 312.

Figure 4:
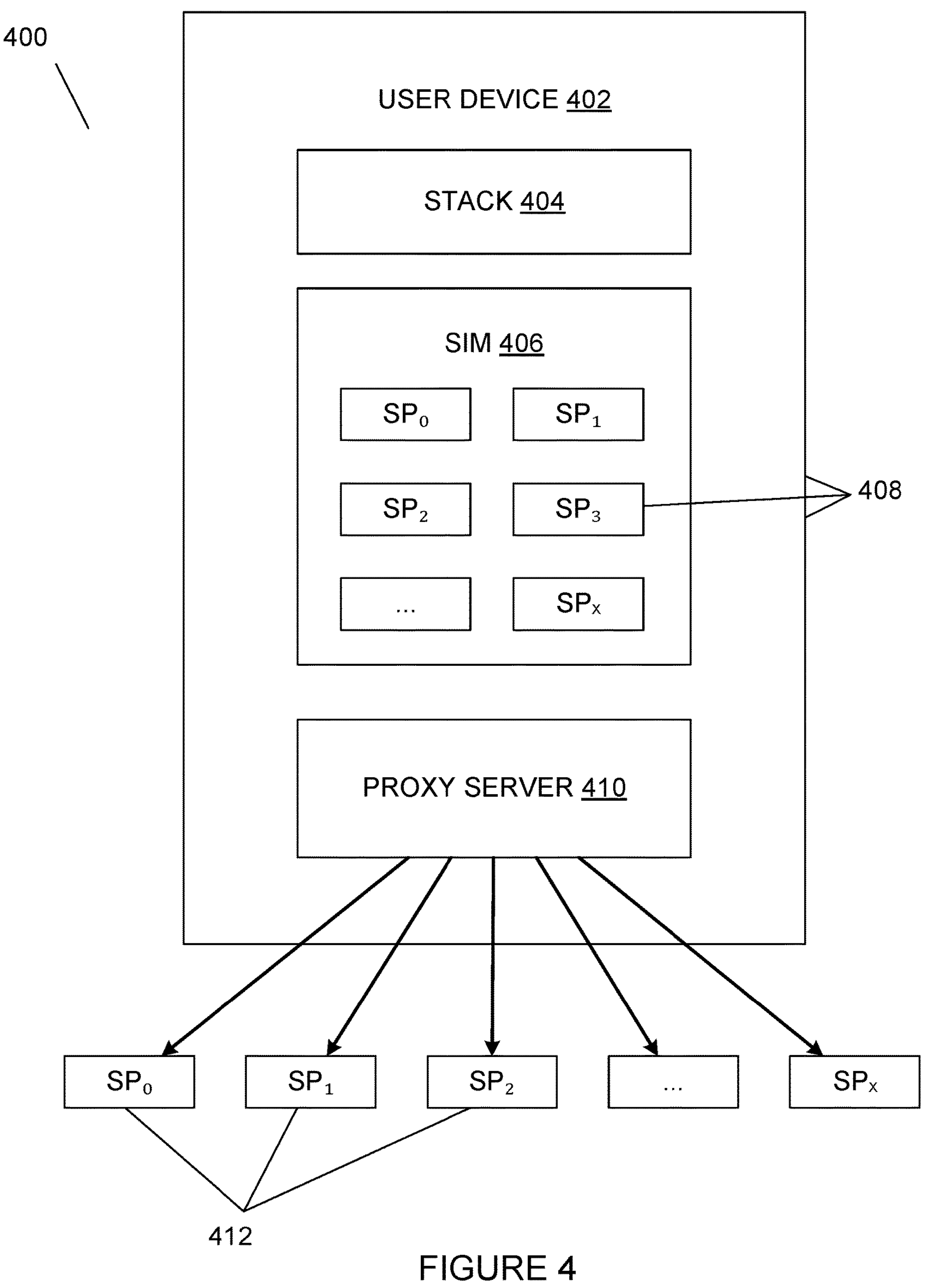
FIG. 4 is a block diagram illustrating multi-link connectivity management of an information handling system with a local proxy server according to certain embodiments of the disclosure.

FIG. 4 is a block diagram illustrating multi-link connectivity management of an information handling system with a local proxy server according to certain embodiments of the disclosure. Block diagram 400 depicts an information handling system, user device 402 comprising protocol stack 404 and SIM 406. The user device 402 utilizes a local proxy server 410 to initiate a connection with more than one service provider 412. The proxy server 410 may store the information for the user of user device 402, information for the available service providers 412 within a geological area, and costs associated with each service provider 412. The proxy server 410 may execute an algorithm to determine which service provider profile 408 is selected according to certain embodiments. In other embodiments, such information related to the user and service providers may be local to the user device 402 but not stored on the local proxy server. SIM 406 may be a physical SIM card located within the user device 402 or a software-based virtual-SIM or eSIM. Service provider profiles 408 located on the user device 402 are tokens, each associated with a profile of an available service provider 412.

The user device 402 may send more than one request for subscriber identity information to the proxy server 410. Each request may pertain to a certain application or service. Examples would include originating a call, streaming a video, or accessing an online service or application which requires wireless connectivity according to some embodiments of the disclosure. Each request may be associated with different quality of service needs, for which different service providers may be the optimal connection. The proxy server 410 may select one of a plurality of service providers 412 for a communication session for each independent request. The proxy server 410 instructs the user device 402 to select the corresponding service provider profile 408 located on the user device 402. As a result, the user device 402 may be simultaneously connected with more than one of the plurality of available service providers 412.

Figure 5:
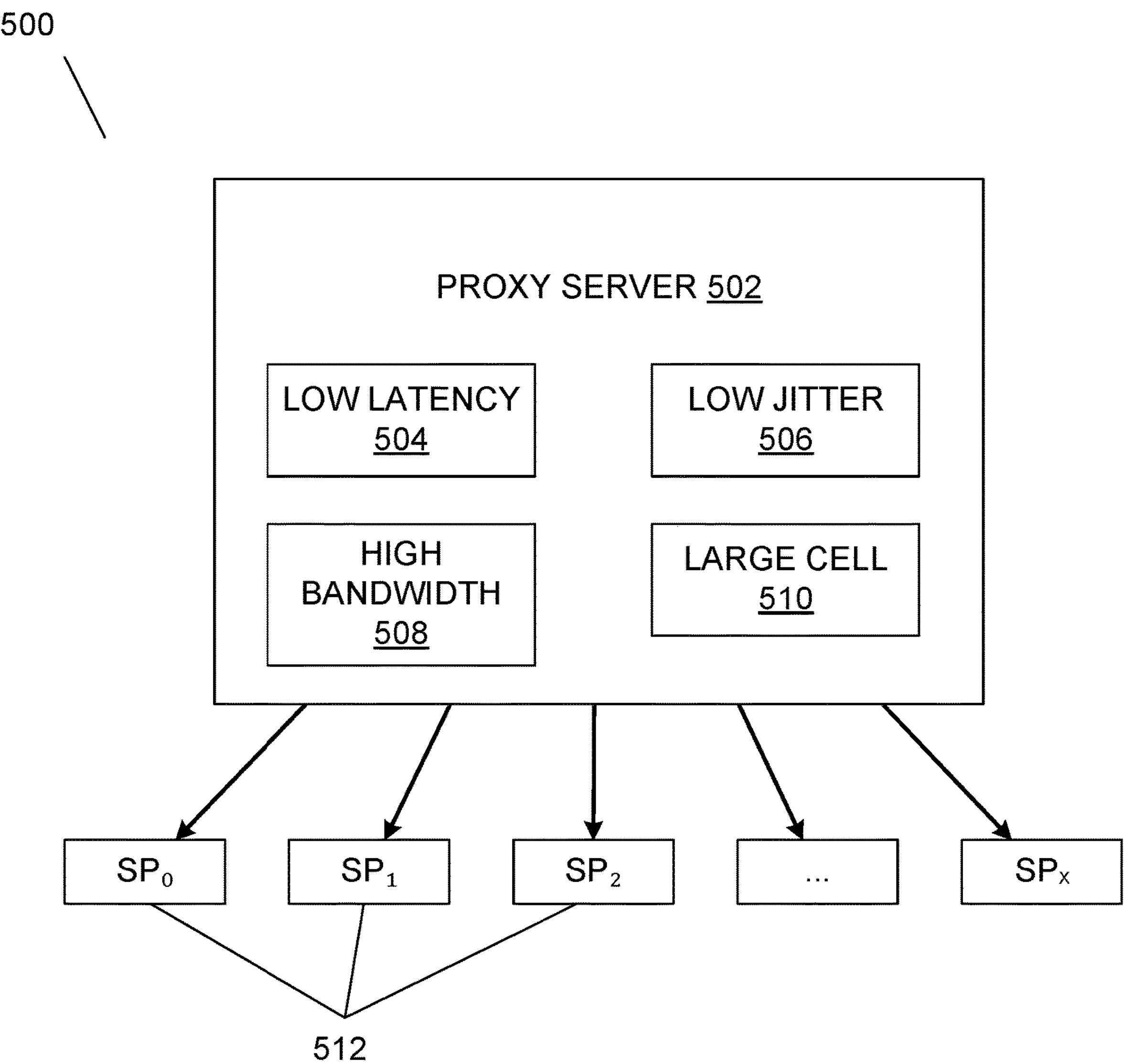
FIG. 5 is a block diagram illustrating a proxy server determining a connection from a plurality of available connections according to certain embodiments of the disclosure.

FIG. 5 is a block diagram illustrating a proxy server determining a connection from a plurality of available connections according to some embodiments of the disclosure. Block diagram 500 depicts a proxy server 502 communicating and establishing connections with at least one of a plurality of service providers 512. The proxy server 502 may establish a connection with a service provider 512 based, at least in part, on the location of the information handling system, the cost of connectivity associated with each available connection, application requirements for quality of service associated with a request from an information handling system, user preferences, and/or other efficiency parameters. Such QoS requirements may include, for example, a desired low latency 504, high bandwidth 508, low jitter 506, or large cell 510. The quality of service requirements indicated by the information handling system are based on the application or service which requires wireless connectivity being performed by the information handling system. The proxy server 502 selects the optimal service provider 512 for each request. The information handling system may be simultaneously connected with more than one of the plurality of available service providers 512, each with an independent communication session providing connectivity for an application hosted by the information handling system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. One example configuration of an information handling system is described with reference to FIG. 6.

Figure 6:
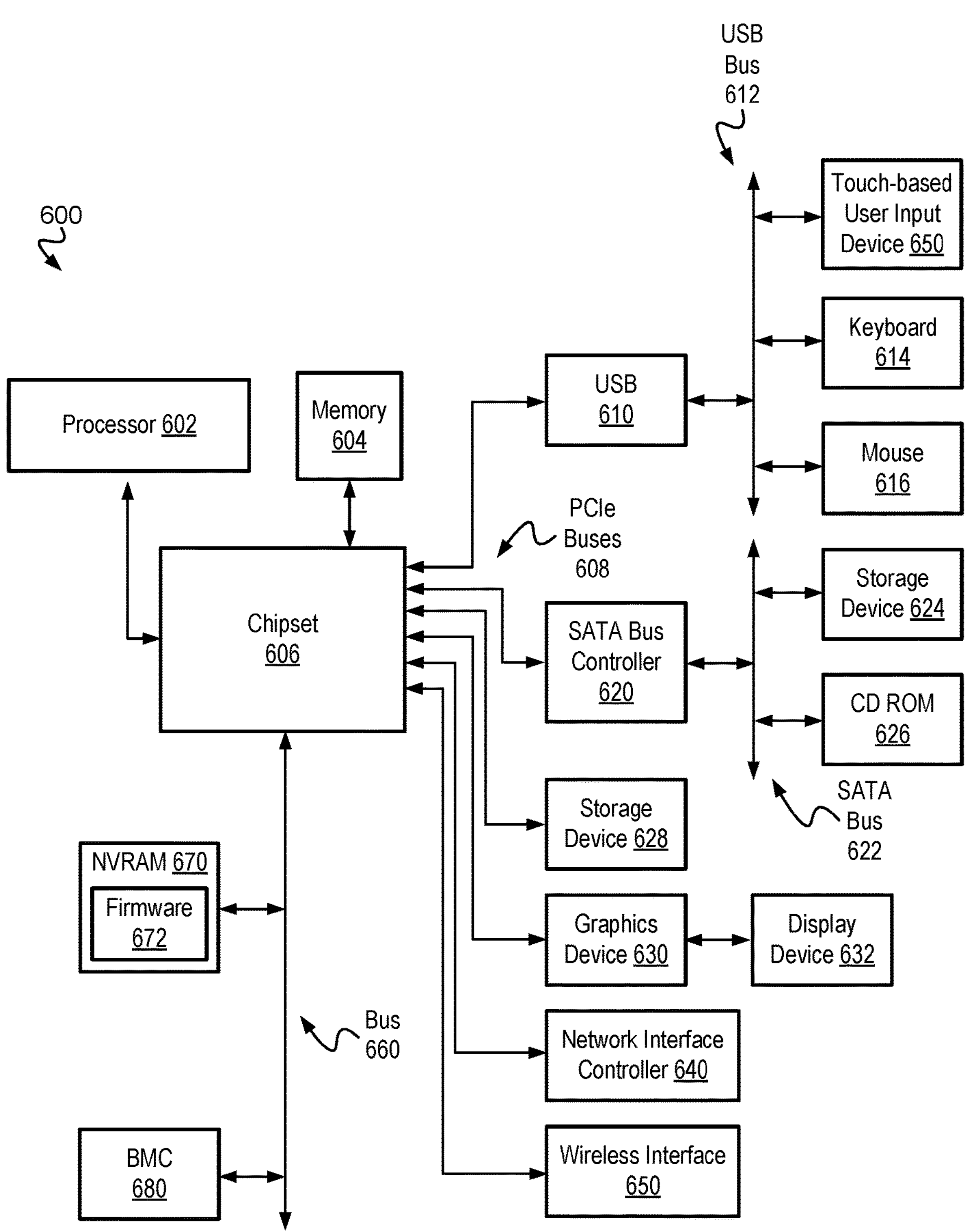
FIG. 6 is a schematic block diagram of an example information handling system according to some embodiments of the disclosure.

FIG. 6 illustrates an example information handling system 600, which may be an embodiment of a device configured by a proxy server or may be an embodiment of the proxy server. Information handling system 600 may include a processor 602 (e.g., a central processing unit (CPU)), a memory (e.g., a dynamic random-access memory (DRAM)) 604, and a chipset 606. In some embodiments, one or more of the processor 602, the memory 604, and the chipset 606 may be included on a motherboard (also referred to as a mainboard), which is a printed circuit board (PCB) with embedded conductors organized as transmission lines between the processor 602, the memory 604, the chipset 606, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 602, the memory 604, the chipset 606, and/or other components may be organized as a System on Chip (SoC).

The processor 602 may execute program code by accessing instructions loaded into memory 604 from a storage device, executing the instructions to operate on data also loaded into memory 604 from a storage device, and generate output data that is stored back into memory 604 or sent to another component. The processor 602 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 602 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 606 may facilitate the transfer of data between the processor 602, the memory 604, and other components. In some embodiments, chipset 606 may include two or more integrated circuits (ICs), such as a northbridge controller coupled to the processor 602, the memory 604, and a southbridge controller, with the southbridge controller coupled to the other components such as USB 610, SATA 620, and PCIe buses 608. The chipset 606 may couple to other components through one or more PCIe buses 608.

Some components may be coupled to one bus line of the PCIe buses 608, whereas some components may be coupled to more than one bus line of the PCIe buses 608. One example component is a universal serial bus (USB) controller 610, which interfaces the chipset 606 to a USB bus 612. A USB bus 612 may couple input/output components such as a keyboard 614 and a mouse 616, but also other components such as USB flash drives, or another information handling system. Another example component is a SATA bus controller 620, which couples the chipset 606 to a SATA bus 622. The SATA bus 622 may facilitate efficient transfer of data between the chipset 606 and components coupled to the chipset 606 and a storage device 624 (e.g., a hard disk drive (HDD) or solid-state disk drive (SDD)) and/or a compact disc read-only memory (CD-ROM) 626. The PCIe bus 608 may also couple the chipset 606 directly to a storage device 628 (e.g., a solid-state disk drive (SDD)). A further example of an example component is a graphics device 630 (e.g., a graphics processing unit (GPU)) for generating output to a display device 632, a network interface controller (NIC) 640, and/or a wireless interface 650 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 606 may also be coupled to a serial peripheral interface (SPI) and/or Inter-Integrated Circuit (I2C) bus 660, which couples the chipset 606 to system management components. For example, a non-volatile random-access memory (NVRAM) 670 for storing firmware 672 may be coupled to the bus 660. As another example, a controller, such as a baseboard management controller (BMC) 680, may be coupled to the chipset 606 through the bus 660. BMC 680 may be referred to as a service processor or embedded controller (EC). Capabilities and functions provided by BMC 680 may vary considerably based on the type of information handling system. For example, the term baseboard management system may be used to describe an embedded processor included at a server, while an embedded controller may be found in a consumer-level device. As disclosed herein, BMC 680 represents a processing device different from processor 602, which provides various management functions for information handling system 600. For example, an embedded controller may be responsible for power management, cooling management, and the like. An embedded controller included at a data storage system may be referred to as a storage enclosure processor or a chassis processor.

System 600 may include additional processors that are configured to provide localized or specific control functions, such as a battery management controller. Bus 660 can include one or more busses, including a Serial Peripheral Interface (SPI) bus, an Inter-Integrated Circuit (I2C) bus, a system management bus (SMBUS), a power management bus (PMBUS), or the like. BMC 680 may be configured to provide out-of-band access to devices at information handling system 600. Out-of-band access in the context of the bus 660 may refer to operations performed prior to execution of firmware 672 by processor 602 to initialize operation of system 600.

Firmware 672 may include instructions executable by processor 602 to initialize and test the hardware components of system 600. For example, the instructions may cause the processor 602 to execute a power-on self-test (POST). The instructions may further cause the processor 602 to load a boot loader or an operating system (OS) from a mass storage device. Firmware 672 additionally may provide an abstraction layer for the hardware, such as a consistent way for application programs and operating systems to interact with the keyboard, display, and other input/output devices. When power is first applied to information handling system 600, the system may begin a sequence of initialization procedures, such as a boot procedure or a secure boot procedure. During the initialization sequence, also referred to as a boot sequence, components of system 600 may be configured and enabled for operation and device drivers may be installed. Device drivers may provide an interface through which other components of the system 600 can communicate with a corresponding device. The firmware 672 may include a basic input-output system (BIOS) and/or include a unified extensible firmware interface (UEFI). Firmware 672 may also include one or more firmware modules of the information handling system. Additionally, configuration settings for the firmware 672 and firmware of the information handling system 600 may be stored in the NVRAM 670. NVRAM 670 may, for example, be a non-volatile firmware memory of the information handling system 600 and may store a firmware memory map namespace 600 of the information handling system. NVRAM 670 may further store one or more container-specific firmware memory map namespaces for one or more containers concurrently executed by the information handling system.

Information handling system 600 may include additional components and additional busses, not shown for clarity. For example, system 600 may include multiple processor cores (either within processor 602 or separately coupled to the chipset 606 or through the PCIe buses 608), audio devices (such as may be coupled to the chipset 606 through one of the PCIe busses 608), or the like. While a particular arrangement of bus technologies and interconnections is illustrated for the purpose of example, one of skill will appreciate that the techniques disclosed herein are applicable to other system architectures. System 600 may include multiple processors and/or redundant bus controllers. In some embodiments, one or more components may be integrated together in an integrated circuit (IC), which is circuitry built on a common substrate. For example, portions of chipset 606 can be integrated within processor 602. Additional components of information handling system 600 may include one or more storage devices that may store machine-executable code, one or more communications ports for communicating with external devices, and various input and output (I/O) devices, such as a keyboard, a mouse, and a video display.

In some embodiments, processor 602 may include multiple processors, such as multiple processing cores for parallel processing by the information handling system 600. For example, the information handling system 600 may include a server comprising multiple processors for parallel processing. In some embodiments, the information handling system 600 may support virtual machine (VM) operation, with multiple virtualized instances of one or more operating systems executed in parallel by the information handling system 600. For example, resources, such as processors or processing cores of the information handling system may be assigned to multiple containerized instances of one or more operating systems of the information handling system 600 executed in parallel. A container may, for example, be a virtual machine executed by the information handling system 600 for execution of an instance of an operating system by the information handling system 600. Thus, for example, multiple users may remotely connect to the information handling system 600, such as in a cloud computing configuration, to utilize resources of the information handling system 600, such as memory, processors, and other hardware, firmware, and software capabilities of the information handling system 600. Parallel execution of multiple containers by the information handling system 600 may allow the information handling system 600 to execute tasks for multiple users in parallel secure virtual environments.

The flowchart diagram of FIG. 2 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Certain elements of embodiments described in this specification have been labeled as modules. A module may include a component of that information handling system suitably programmed to operate according to executable instructions. For example, a module may be implemented as a hardware circuit comprising custom VLSI circuits or gate arrays, semiconductor chips comprising logic circuitry, transistors, or other discrete components. A module may also be implemented in programmable hardware devices such as field programmable gate arrays, programmable array logic, programmable logic devices, a controller, or the like.

Modules may also include software-defined units or instructions that, when executed by a component of an information handling system, retrieve and transform data stored on a data storage device from a first state to a second state. An identified module of executable code may, for example, comprise one or more physical blocks of computer instructions which may be organized as an object, procedure, or function. The executables of an identified module need not be physically located together, but may comprise disparate instructions stored in different locations which, when joined logically together, comprise the module, and when executed by the processor, achieve the stated data transformation.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:

receiving, by a proxy server, a request for subscriber identity information from an information handling system;

performing, by the proxy server, registration of the information handling system to a network accessible from a location of the information handling system;

determining, by the proxy server, a connection from a plurality of available connections for a communication session based on quality of service associated with the request, cost of connectivity with each available connection, the location of the information handling system, and user preferences, wherein the plurality of available connections being from among a plurality of service providers; and communicating, by the proxy server, with an authentication service corresponding to the connection to authenticate the information handling system for establishing the communication session on the connection.

2. The method of claim 1, wherein the proxy server is either local on the information handling system or global.

3. The method of claim 1, wherein each of the plurality of available connections is associated with a profile on the information handling system.

4. The method of claim 1, wherein the information handling system simultaneously connects with more than one of the plurality of available connections.

5. The method of claim 1, wherein the proxy server comprises credentials from the information handling system.

6. An information handling system comprising:

a memory; and a processor coupled to the memory, wherein the processor is configured to perform the steps comprising:

receiving, by a proxy server, a request for subscriber identity information from an information handling system;

performing, by the proxy server, registration of the information handling system to a network accessible from a location of the information handling system;

determining, by the proxy server, a connection from a plurality of available connections for a communication session based on quality of service associated with the request, cost of connectivity with each available connection, the location of the information handling system, and user preferences, wherein the plurality of available connections being from among a plurality of service providers; and communicating, by the proxy server, with an authentication service corresponding to the connection to authenticate the information handling system for establishing the communication session on the connection.

7. The information handling system of claim 6, wherein the information handling system simultaneously connects with more than one of the plurality of available connections.

8. The information handling system of claim 6, wherein the proxy server comprises credentials from the information handling system.

9. The information handling system of claim 6, wherein the proxy server is either local on the information handling system or global.

10. The information handling system of claim 6, wherein each of the plurality of available connections is associated with a profile on the information handling system.

11. A computer program product, comprising:

a non-transitory computer readable medium comprising instructions for causing an information handling system to perform steps comprising:

receiving, by a proxy server, a request for subscriber identity information from an information handling system;

performing, by the proxy server, registration of the information handling system to a network accessible from a location of the information handling system;

determining, by the proxy server, a connection from a plurality of available connections for a communication session based on quality of service associated with the request, cost of connectivity with each available connection, the location of the information handling system, and user preferences, wherein the plurality of available connections being from among a plurality of service providers; and communicating, by the proxy server, with an authentication service corresponding to the connection to authenticate the information handling system for establishing the communication session on the connection.

12. The computer program product of claim 11, wherein each of the plurality of available connections is associated with a profile on the information handling system.

13. The computer program product of claim 11, wherein the information handling system simultaneously connects with more than one of the plurality of available connections.

14. The computer program product of claim 11, wherein the proxy server comprises credentials from the information handling system.

* * * * *